United States Patent
Murakowski

(10) Patent No.: US 12,176,951 B1
(45) Date of Patent: Dec. 24, 2024

(54) IMAGING RECEIVERS AND RELATED METHODS OF OPERATION MAPPING SPACE-DIVISION MULTIPLEXING TO WAVELENGTH-DIVISION MULTIPLEXING

(71) Applicant: Phase Sensitive Innovations, Inc., Newark, DE (US)

(72) Inventor: Janusz Murakowski, Bear, DE (US)

(73) Assignee: Phase Sensitive Innovations, Inc., Newark, DE (US)

( * ) Notice: Subject to any disclaimer, the term of this patent is extended or adjusted under 35 U.S.C. 154(b) by 150 days.

(21) Appl. No.: 17/894,072

(22) Filed: Aug. 23, 2022

Related U.S. Application Data

(60) Provisional application No. 63/236,174, filed on Aug. 23, 2021.

(51) Int. Cl.
| | |
|---|---|
| *H04B 10/2575* | (2013.01) |
| *H01Q 15/04* | (2006.01) |
| *H04B 10/50* | (2013.01) |
| *H04B 10/572* | (2013.01) |

(52) U.S. Cl.
CPC ....... *H04B 10/25759* (2013.01); *H01Q 15/04* (2013.01); *H04B 10/506* (2013.01); *H04B 10/572* (2013.01)

(58) Field of Classification Search
CPC ............ H04B 10/25759; H04B 10/506; H04B 10/572; H01Q 15/04
USPC ........................................................ 398/204
See application file for complete search history.

(56) References Cited

U.S. PATENT DOCUMENTS

| | | | |
|---|---|---|---|
| 6,020,850 A | 2/2000 | Ji et al. | |
| 7,773,942 B2 | 8/2010 | Hudson et al. | |
| 8,995,843 B2* | 3/2015 | Chung | H04J 14/026 398/79 |
| 10,484,081 B1 | 11/2019 | Chang et al. | |
| 2005/0003763 A1 | 1/2005 | Lastinger et al. | |
| 2010/0221015 A1* | 9/2010 | Williams | G01S 3/22 398/115 |
| 2015/0341091 A1 | 11/2015 | Park et al. | |
| 2016/0006516 A1* | 1/2016 | Schuetz | H04B 10/64 398/115 |
| 2017/0041068 A1 | 2/2017 | Murakowski et al. | |
| 2017/0085323 A1 | 3/2017 | Schuetz et al. | |
| 2018/0309515 A1* | 10/2018 | Murakowski | H04B 10/2575 |
| 2019/0190599 A1 | 6/2019 | Murakowski et al. | |

(Continued)

FOREIGN PATENT DOCUMENTS

| | | |
|---|---|---|
| AU | 2017203545 A1 | 6/2017 |
| WO | WO2021155021 | 1/2021 |
| WO | 4097876 | 8/2022 |

OTHER PUBLICATIONS

Khandaker et al; Joint Transceiver Optimization for Multiuser MIMO Relay Communication Systems ; Nov. 2012; IEEE transactions of signal processing; pp. 1-10. (Year: 2012).*

(Continued)

*Primary Examiner* — Amritbir K Sandhu
(74) *Attorney, Agent, or Firm* — Muir Patent Law, PLLC

(57) ABSTRACT

A system architecture is described that allows mapping of different RF-wave directions (e.g., Angles of Arrival or "AoA-s") to different optical-carrier wavelengths. Such mapping enables the transmission of all information captured by a phased array, including spatial information of the incoming RF waves, using a single optical fiber.

26 Claims, 9 Drawing Sheets

(56) References Cited

U.S. PATENT DOCUMENTS

| | | |
|---|---|---|
| 2019/0319356 A1 | 10/2019 | Shi et al. |
| 2019/0319368 A1 | 10/2019 | Fillion |
| 2019/0020401 A1 | 11/2019 | Gharavi et al. |
| 2019/0191419 A1 | 12/2019 | Liu et al. |
| 2019/0372219 A1 | 12/2019 | Schneider et al. |
| 2021/0257729 A1 | 8/2021 | Murakowski et al. |

OTHER PUBLICATIONS

Khandaker, et al., "Joint Transceiver Optimization for Multiuser MIMO Relay Communication Systems" IEEE Transactions on Signal Processing. vol. 60. No. 11, Nov. 2012.
Supplementary Partial European Search Report dated Jan. 8, 2024, for corresponding EP patent application No. EP 21747279.
U.S. Appl. No. 17/160,676, filed Jan. 28, 2021, Janusz Murakowski.
U.S. Appl. No. 17/894,072, filed Aug. 23, 2022, Janusz Murakowski.
Akiyama et al., "Two-Dimensional Optical Signal-Processing Beamformer Using Multilayer Polymeric Optical Waveguide Arrays", IEEE Transactions on Microwave Theory and Techniques, vol. 49, No. 10, Oct. 2001.
Koepf, "Optical Processor For Phased-Array Antenna Beam Formation", Proc. SPIE 0477, Optical Technology for Microwave Applications I, (Nov. 1, 1987); doi: 10.1117/12.942616.
Ogawa et al., "Two-Dimensional Multiple Beam Forming Using Slab-Waveguide-Implemented Photonic Beam Forming Network," 1996.
Shelton, "Multibeam Planar Arrays", Proceedings of the IEEE, vol. 56, No. 11, Nov. 1968.
Shelton, "On the Equivalence of Two-Dimensional and Three-Dimensional Multibeam Microwave Lenses", Naval Research Lab, Jul. 1981.
Shibata et al., "Spatial Optical Beam-Forming Network for Receiving-Mode Multibeam Array Antenna—Proposal and Experiment",IEEE Transactions on Microwave Theory and Techniques, vol. 50, No. 5, May 2002.

\* cited by examiner

IMAGING RECEIVERS AND RELATED METHODS OF OPERATION MAPPING SPACE-DIVISION MULTIPLEXING TO WAVELENGTH-DIVISION MULTIPLEXING

RELATED APPLICATIONS

This application is a non-provisional application of Provisional Application No. 63/236,174 filed Aug. 23, 2021, the entire contents of which are hereby incorporated by reference.

TECHNICAL FIELD

This disclosure relates generally to wireless communication, and, in particular embodiments to receive signals using antenna phased arrays.

BACKGROUND

In an imaging receiver, previously disclosed in U.S. Pat. No. 9,800,346 (herein incorporated by reference in its entirety), a plurality of signals from antenna elements modulate an optical carrier to produce a plurality of modulated optical signals traveling in the corresponding first plurality of optical channels. The outputs of the optical channels are arranged in a pattern corresponding to the pattern in which the antennas are arranged to generate a composite optical signal such that the spatially distinct elements of the composite optical signal may correspond to the directions of the incoming radio-frequency (RF) waves received by the antenna elements that produce the signals. The spatially distinct elements of the composite optical signal may be captured by a second plurality of optical channels, so that each of those channels carry an optical signal corresponding to a particular direction of arrival of the RF wave. Accordingly, in U.S. Pat. No. 9,800,346, multiple optical channels carry information from RF waves arriving from multiple directions, wherein each optical channel of the second plurality corresponds to a particular RF-wave direction of arrival.

SUMMARY

In some applications, it may be desirable to use a single optical channel, e.g., an optical fiber, to carry information contained in RF waves arriving from multiple directions while still distinguishing the angle of arrival (AoA). One way to accomplish this distinguishability is to encode different directions on different optical wavelengths of the optical carrier. For example, the RF wave arriving from upper left direction may be mapped to a modulation sideband of an optical carrier with wavelength $\lambda_1$ whereas the RF wave arriving from the upper right direction may be mapped to a modulation sideband of an optical carrier with wavelength $\lambda_2$, where $\lambda_1$ and $\lambda_2$ are distinct, etc. Here, we disclose a method and a device that provide for such a mapping of different RF-wave directions to different optical wavelengths such that optical signals corresponding to these RF waves may be combined and simultaneously transmitted and travel in a single optical channel.

Embodiments herein relate to an optical processor, such as a beam-to-color transformer (BC transformer), that may encode information carried by different physical beams in different colors, or wavelengths, of light for transmission in an optical waveguide, such as an optical fiber. The optical processor may be part of an imaging receiver where a modulation sideband corresponding to an RF wave (emitted by an RF source and captured by an antenna array) having a particular angle of arrival ("AoA") is mapped to different spatial positions in the optical processor, which allows combining sidebands corresponding to different RF waves having different AoAs to a single output (such as a single optical fiber) in a way that different AoAs correspond to sidebands of different-wavelength optical carriers.

DETAILED DESCRIPTION

Figure 1:
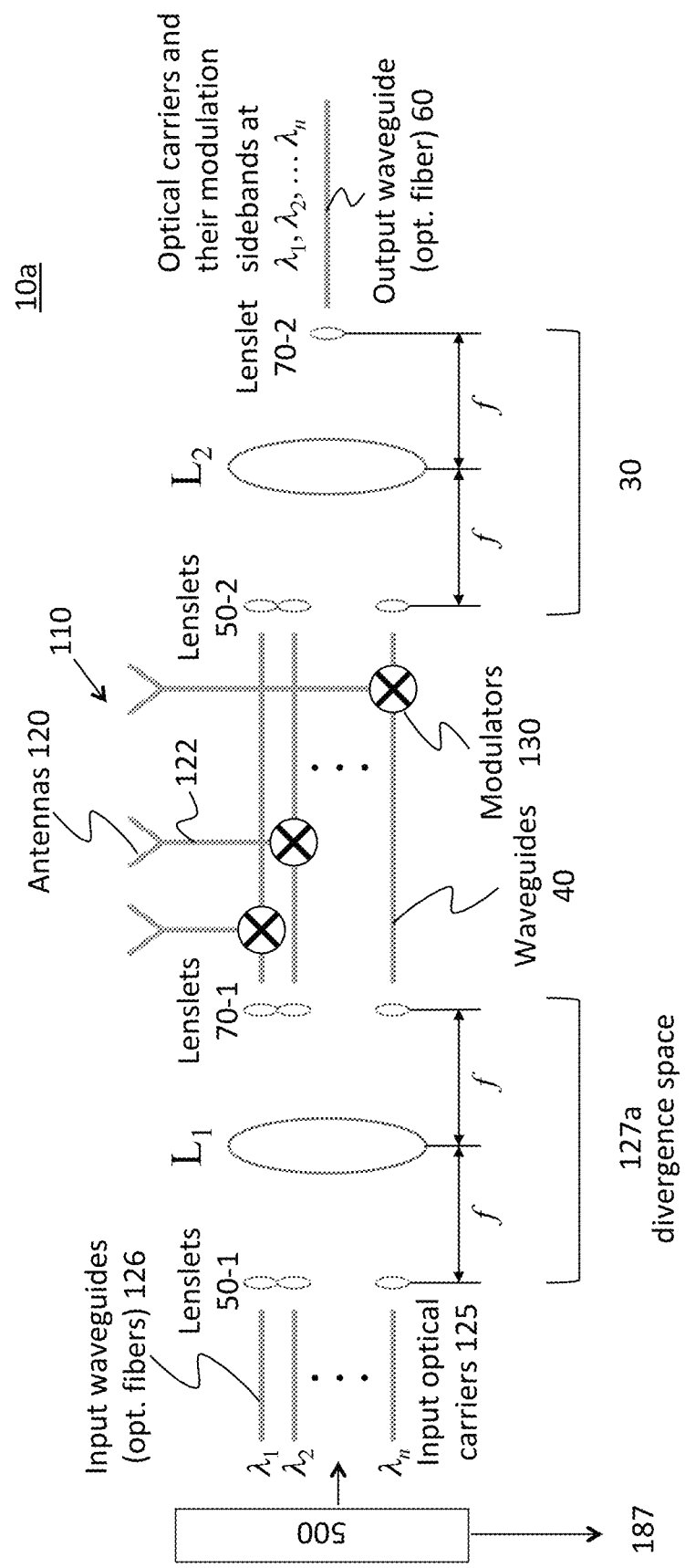
FIG. 1 is a schematic diagram of an RF-photonic system that maps different directions of RF-wave arrival to different optical wavelengths.

The present disclosure now will be described more fully hereinafter with reference to the accompanying drawings, in which various exemplary implementations are shown. The invention may, however, be embodied in many different forms and should not be construed as limited to the exemplary implementations set forth herein. These exemplary implementations are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

Like numbers refer to like elements throughout. Reference numeral use of suffixes may be used to identify similar elements, such as to distinguish between individual ones of identical elements or to denote specific or alternative implementations of an element. Suffixes may also be used to generically refer to any one of a group of similar. Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

Though the different figures show variations of exemplary implementations, these figures are not necessarily intended to be mutually exclusive from each other. Rather, as will be seen from the context of the detailed description below, certain features depicted and described in different figures will be understood to be used with other features illustrated in other figures to result in various exemplary implementations.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). Components described as being "electrically connected" (or "optically connected") are configured such that an electrical signal (or optical signal) can be transferred from one component to the other (although such signal may be attenuated in strength as it is transferred, may be selectively transferred, may be transferred through duplication or splitting, and may be transferred when combined with other signals (e.g., as a component of a composite signal)).

Figure 8:
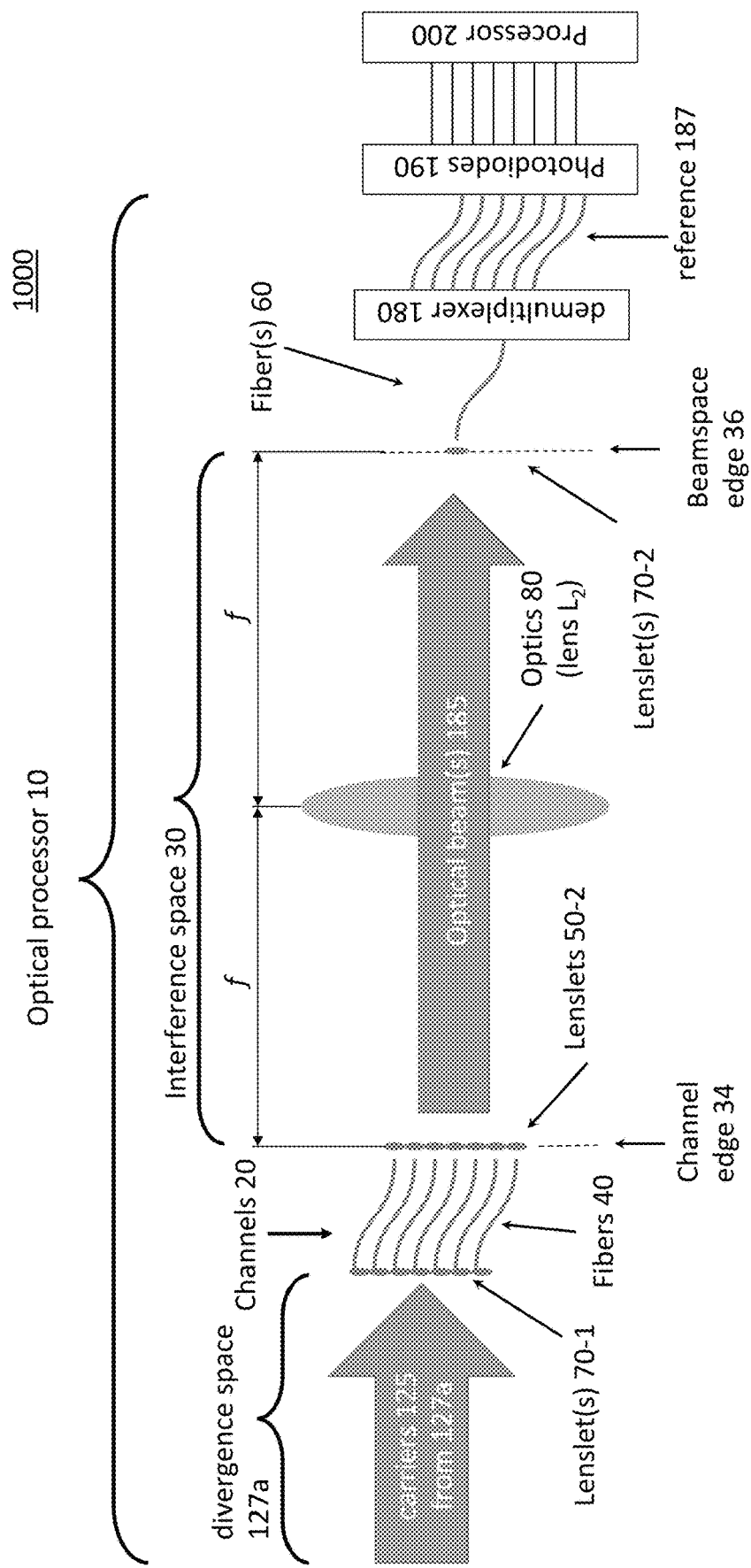
FIG. 8 illustrates details of an imaging receiver that may incorporate the optical processors described herein.

FIG. 1 is a schematic diagram of an optical processor 10a hat encodes different RF-wave directions in different wavelengths of light carried by the same optical channel. FIG. 8 illustrates further details of an optical processor 10, such as optical processor 10a, and its use within a receiver 1000. The optical processor 10a may be part of an imaging receiver which, in addition to the optical processor 10a, also includes antenna array 110 formed of a plurality of individual antennas 120 (which may also be referred to herein as antenna element). The optical carriers 125 with different wavelengths $\lambda_1, \lambda_2, \ldots, \lambda_n$ enter the system in respective optical waveguides 126. The waveguides 126 are arranged in a first pattern at their outputs at a divergence space 127a through corresponding lenslets 50-1 that collimate the beams emanating from the optical waveguides 126. The lenslets 50-1 are placed in the focal plane of lens $L_1$, which has lenslets 70-1 in its other focal plane at the output of the divergence space 127a. Lenslets 70-1, arranged in a second pattern, couple incoming light into waveguides 40. The placement of lenslets 50-1 and 70-1 with respect to lens $L_1$ is such that each input optical carrier couples into all waveguides 40, albeit with different phase distributions.

The divergence space 127a, together with lens $L_1$, form an optical splitter—each optical carrier 125 input into the divergence space 127a is split into the outputs of divergence space 127a (lenslets 70-1 and waveguides 40). The divergence space 127a, together with lens $L_1$, also form an optical combiner, combining all of the optical carriers 125 input into the divergence space 127a into each output of the divergence space 70-1. The divergence space 127a with lens may thus comprise a splitter-combiner (sometimes also referred to as a multi-mode interference region or simply a lense). Alternative configurations for the splitter-combiner comprise The divergence space may have the same or similar structure to the interference space 30, such as comprising free space, a slab waveguide, etc., in which the optical beams traveling through the divergence space 127a are unconfined at least to an extent to allow each of the optical beams to diverge to be input to each output (e.g., lenslets 70-1, waveguides 40) of the divergence space 127a.

The divergence space 127a also creates a linear phase offset with respect to each of the optical carriers 125 at the output (lenslets 70-1) of the divergence space 127a. Specifically, for a single lenslet 50-1 output of a particular optical carrier 125, the different optical path lengths from that lenslet 50-1 to each of the lenslets 70-1 introduces phase offsets with respect to that optical carrier 125 as captured by the lenslets 70-1, which result in a linear phase offset of the particular optical carrier 125 at the interference space 30 (at lenslets 50-2). As the differences in optical path lengths from a lenslet 50-1 to the lenslets 70-1 depend on the location of the lenslet 50-1, the divergence space 127a generates linear phase offsets of differing degree (or different slope) for each of the optical carriers 125 (in dependence on which lenslet 50-1 the optical carrier 125 is output into divergence space 127a). As discussed in more detail herein, the linear phase offset at the channel edge 34 of a particular optical carrier 125 determines a wavefront direction of that optical carrier in the interference space 30 (and provides the direction from which the modulation sideband direction deviates in the interference space), which in turn determines the spatial location of the optical carrier when focused at the beamspace edge 36 of the interferences space (from which the modulation sidebands are spatially offset).

Other optical devices may be used instead of the divergence space 127a and lens $L_1$. For example, a star coupler (which may be formed as part of a photonic integrated circuit) may provide the same optical processing of splitting/combining/phase distribution of plural optical carriers 125. Separate optical devices may also be used to implement the same optical processing of splitting/combining/phase distribution of plural optical carriers 125, (e.g., as described with respect to FIG. 4, an optical combiner may combine plural optical carriers 125, an optical splitter may split the combined optical carriers 125 to waveguides 40, and linear phase offsets may be introduced to each optical carrier 125 by phase delays (for example, by adjustable phase delay devices in the optical paths of waveguides 40 or by different length optical paths of the waveguides 40).

Each of waveguides 40 has an electro-optic modulator 130 in its path. Antennas 120 generate RF electrical signals and provide the same to the electrical inputs of the modulators 130. The antennas 120 may be connected to the modulators 130 via RF transmission lines 122 to receive the RF electrical signals. Alternatively, the modulators 130 may be directly connected to the antennas 120, such that the RF electrical signal output by the antenna (e.g., without any RF transmission line). For example, each of the modulators may be formed in an lithium-niobate substrate with antennas patterned on this substrate to provide the RF electrical signal that modulates the optical signals being transmitted through an optical waveguide formed in the lithium niobate substrate. The connection between each antenna and modulator may be provided in an integrated package, such as that described in U.S. Provisional Patent No. 63/345,087 filed May 24, 2022, herein incorporated by reference in its entirety. RF amplifiers (not shown), such as low-noise amplifiers (LNA) may be inserted between each antenna 120 and each modulator 130 to boost the electrical signal generated by the antenna 120. In addition, a mixer (not shown) may be inserted between each antenna 120 and each modulator 130 to upmix or downmix the frequency of the RF electrical signal. RF connectors (not shown) may connect the antennas 120 to the transmission lines 122, or otherwise be inserted in the RF electrical signal paths between the antennas 120 and the modulators 130 to allow different antennas (e.g., having different operational frequencies) to operate with the receiver 1000. The antennas 120 are arranged in a third pattern that corresponds to the second pattern. As a result, the modulators 130 output optical carriers 125 modulated with respective signals provided by the antennas 120.

For each optical carrier 125 and each incoming RF wave, a modulator 130 outputs the optical carrier 125 and modulation sidebands at frequencies equal to the optical carrier 125+/−the frequenc(ies) of that RF wave. To identify particular modulation sidebands that result from modulation of an optical carrier of a wavelength of $\lambda_i$, (or frequency of $\omega_i$), the disclosure may refer to these modulation sidebands as being "of" or "associated with" an optical carrier $\lambda_i$, (or "of" or "associated with" an optical carrier having a frequency of $\omega_i$) to denote these modulation sidebands as derived from such optical carrier. Note as well, that modulation sidebands of an optical carrier/may be relatively quite close in frequency to the optical carrier $\lambda_i$ (as compared to the other optical carriers), such that during multiplexing and demultiplexing operations, they may be treated as being at the same wavelength (e.g., in a demultiplexing operation, to be separated together from other optical carriers (and their corresponding modulation sidebands)).—The modulated optical beams emanate from waveguides 40 and are collimated by lenslets 50-2 arranged in a fourth pattern corresponding to the second and third patterns. The lenslets 50-2 are placed in the focal plane of lens $L_2$. The opposite focal plane of lens $L_2$ is occupied by lenslet 70-2 (an optical pickup) that couples the incoming light to the output waveguide 60, which as a result may carry modulation sidebands such that the RF waves captured by the antenna array 110 that have different AoAs (directions of arrival) at the antenna array 110 correspond to different optical carrier wavelengths.

Referring to FIG. 8, the antenna array 110 is formed of a plurality of antennas 120 (horn antennas in this example) arranged in one or two dimensions (e.g., in straight or curved line or in 2D dimensions in a plane or on a curved surface). Note that the antennas 120 may be arranged in two dimensions in a single plane (i.e., restricted to two dimensions) or may be arranged in three dimensions, such as regularly arranged on a curved surface, such as on a hull of an aircraft or vehicle. In addition, the array arrangement may include the temporal dimension by employing different delays in different-length optical fibers or waveguides, as disclosed in U.S. Pat. No. 10,009,098, or U.S. Pat. No. 10,218,438, or U.S. Pat. No. 10,313,012, each of these patents being incorporated herein by reference in its entirety. Unless context indicates otherwise, reference to a 2D antenna array herein should be understood to refer to the dimensions of the array, including an arrangement of antennas distributed in at least two dimensions, but need not be confined to only two dimensions (i.e., refers to both an arrangement of antennas distributed in two dimensions in a plane or an arrangement of antennas in three dimensions). Similarly, a 1D antenna array should be understood to refer to the dimensions of the array (e.g., 1×n array of antennas 120 forming a 1D antenna array 120). It should be appreciated that the 2D antenna array 110 formed of a plurality of antennas 120 may also be referred to itself as an antenna (e.g., a phased array antenna). For clarification, an individual antenna 120 of an antenna array 110 may also be referred to herein as an "antenna element" (depending on context, "element" by itself may refer generically to other structure, such as a transducer/sensor/radiating arm that may be a part of an antenna element or may be part of some other structure).

The antennas 120 are communicatively coupled to an interference space 30 via corresponding channels 20 which may comprise the communication path of the transmission lines 122, modulators 130 and the waveguides 40 extending from the modulator 130 and the interference space 30. For example, the optical processor 10 maybe implemented in a receiver 1000 where electromagnetic radiation (which may be referred to herein as "RF waves") are captured by the antennas 120 and converted to RF electric signals, which are then upconverted to optical signals by electro-optic modulators 130 (refer to FIG. 1) and transmitted to the interference space 30 by optical waveguides 40. The interference space 30 may be free space (e.g., air or a vacuum), a waveguide (e.g., slab waveguide) or other medium that allows transmission of the optical signals (e.g., the optical carriers and their modulation sidebands) to allow the optical signals within the interference space 30 to interfere with one another. Thus, for a particular optical carrier 125, each RF wave captured by the antenna array 110 is transmitted as a corresponding virtual beam via channels 20, where multiple virtual beams (representing multiple RF waves) may be simultaneously transmitted by channels 20 via superposition of signals forming the virtual beams in the channels 20, and then transmitted into the interference space 30 to form corresponding optical beams 185 to represent the corresponding RF waves.

FIG. 1 illustrates an optical source 500 configured to generate optical carriers 125 and one or more reference optical signals 187. The reference optical signal 187 acts as a local oscillator for a down-conversion process to an RF electrical signal by photodiodes 190 and may be also be referenced as "local oscillator" or LO. A first frequency of an optical carrier 125 and a second frequency of its corresponding reference optical signal 187 differ by a set amount (where this difference in frequency may be set by an input to the optical source 500, such as by a user input (e.g., programmed)). In addition, each optical carrier signal 125 and its corresponding reference optical signal 187 may be phase-locked to each other. For example, a variation in phase in an optical carrier 125 produced by a primary laser may cause the same variation in phase in the reference optical signal 187 of a secondary laser (or vice versa). The optical source 500 may comprise a plurality of tunable optical pair sources (TOPSes), such as the TOPS disclosed in "Radiofrequency signal-generation system with over seven octaves of continuous tuning," authored by Schneider et al., and published in Nature Photonics, online Jan. 20, 2013, and/or as disclosed in U.S. Pat. No. 10,965,100, issue Mar. 30, 2021, the contents of each of which is hereby incorporated by reference in its entirety. In some examples, the reference optical signal 187 for a particular optical carrier 125 may be one of the other optical carriers 125. The optical source 500 may also take the form of a frequency comb generator.

Figure 2:
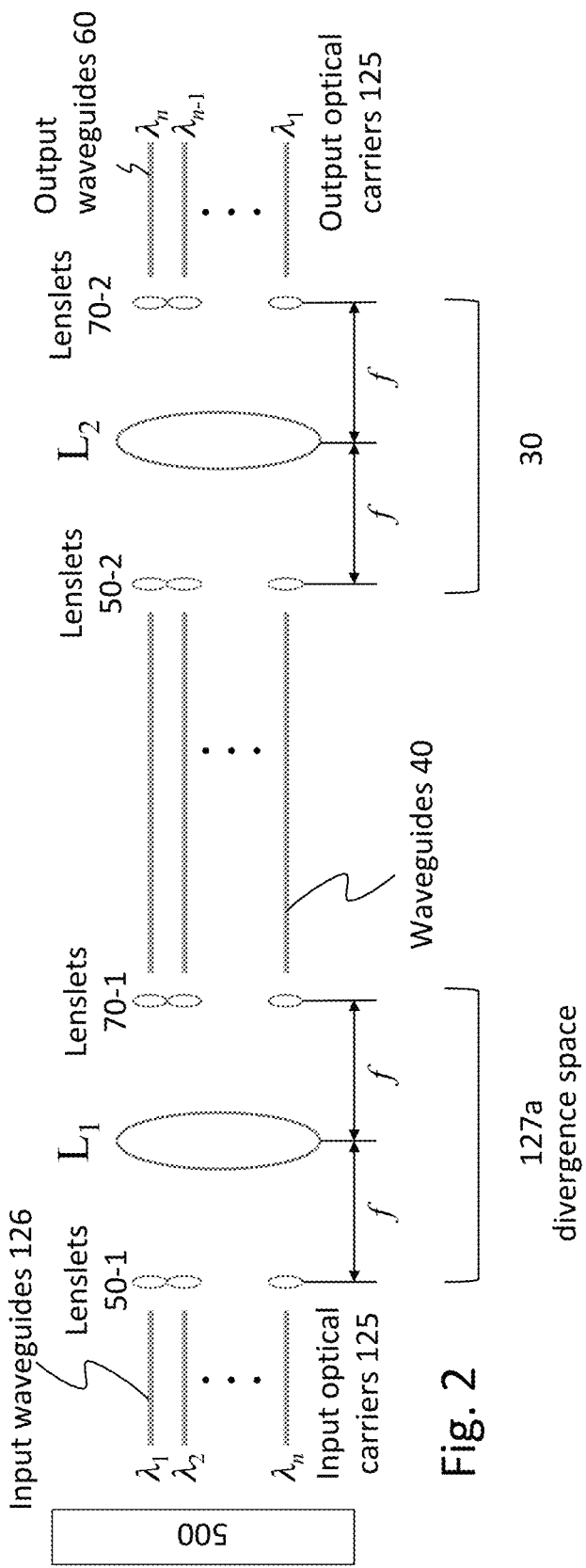
FIG. 2 illustrates the propagation of optical carriers through the RF-photonic system of FIG. 1.

The mechanism, by which different directions map to different wavelengths, may be understood with the help of FIG. 2 showing a diagram similar to that of FIG. 1 except the modulators have been omitted and the output has an array of lenslets 70-2 rather than a single lenslet 70-2. Referring to FIG. 2, the arrangement of components around lens $L_1$ is that of an optical Fourier transformation whereby the lens $L_1$ Fourier-transforms light distribution at one focal plane and generates the result at the other focal plane. Thus, lenslets 70-1 receive the Fourier transform of light distribution at the input lenslets 50-1. Waveguides 40 faithfully carry the distribution of light at lenslets 70-1 to lenslets 50-2. The arrangement of lenslets 50-2, lens $L_2$, and lenslets 70-2 is similar to the arrangement of lenslets 50-1, lens $L_1$, and lenslets 70-1. Therefore, 50-2-$L_2$-70-2 performs a Fourier transformation of light distribution just as 50-1-$L_1$-70-1 did. As a result, light distribution at lenslets 70-2 is a composition of two Fourier transformations, which is a point-reflection transformation. Hence, each of the output optical waveguides 60 receives a single optical carrier 125 launched at the input, and the optical carriers 125 at the output of the interference space 30 (at beamspace edge) have the opposite ordering to that of the optical carriers 125 at their input, as illustrated in FIG. 2.

The schematic diagram of FIG. 2 may be thought of as comprising an optical 4F system (the optics extending between lenslets 50-1 and lenslets 70-2) with the intermediate (Fourier) plane faithfully shifted with the help of waveguides 40. As such, it re-images the original distribution of light at the lenslets 50-1 to the focal surface (at the beamspace edge 36 of the interference space 30) occupied by lenslets 70-2.

Accordingly, in the absence of modulation of the optical carriers 125, the optical carriers 125 with wavelengths $\lambda_1$, $\lambda_2, \ldots, \lambda_n$ are steered to separate outputs as denoted in FIG. 2. Specifically, as discussed herein, each optical carrier 125 is output at the channel edge 34 of the interference space 30 with a corresponding linear phase offset imposed on the outputs 50-2 of that optical carrier 125 to direct a plane wave of that optical carrier 125 to propagate in a direction (corresponding to the linear phase offset) and thus cause that optical carrier 125 to be focused at corresponding location at the beamspace edge 36 (and a corresponding lenslet 70-2 positioned at that location). The different degrees (or slope) of the linear phase offsets of each optical carrier 125 thus create different propagation directions of the resulting plane wave of that optical carrier 125 in the interference space 30, to thus create different focal points of each optical carrier 125 at the beam space edge 36 (to be output from the interference space 30 via different corresponding lenslets 70-2). It should be appreciated that one of the optical carriers 125 may be provided with linear phase offset of zero.

Referring back to FIG. 1, additional spatial offsets may be introduced with respect to each optical carrier 125 by the electro-optic modulators 130 modulation of each optical carrier 125 by an RF wave captured by the antenna array 110. On the other hand, as disclosed in U.S. Pat. No. 9,800,346, with a single optical carrier nominally launched at the equivalent of the center of the input array, the spatial positions of the modulation sidebands at the output of the interference space 30 (at beamspace edge 36) correspond to the directions of the incoming RF waves at the antenna array 110. Specifically, considering a single RF wave captured by the antenna array 110, while each antenna 120 of the array 110 captures the same RF signal of the RF wave, the AoA of the RF wave results in phase shifts between these RF signals generated by the antennas 120. The phase of the RF signal is preserved during its upconversion to a corresponding optical signal when modulated by an electro-optic modulator 130. Thus, phase differences between the RF electrical signals produced by the same RF wave (as provided by the antennas 120) are preserved in the outputs of the electro-optic modulators 130. Specifically, the phase shifts in the RF electrical signals provided by antennas 110 that result from the AoA of a particular RF wave are represented in the difference of phases of modulation sideband optical signals (corresponding to that particualr RF wave) output by the electro-optic modulators 130. Thus, for a particular optical carrier 125 being modulated by the array of electro-optic modulators 130, the modulation sidebands are optical signals providing a corresponding "AoA phase shift" with respect to the optical carrier 125 being modulated, with the entirety of the of the modulation sidebands providing a linear "AoA phase offset" (at the channel edge 34 of the interference space 30) corresponding to the AoA of the RF wave whose RF electrical signals are being upconverted by the modulation. This linear "AoA phase offset" is in addition to (superimposed on) the linear phase offset of the optical carrier 125, and is represented at the beamspace edge 36 as a spatial shift with respect to the location of the optical carrier 125 at the beamspace edge 36 (the linear "AoA phase offset" changing the direction of the wavefront of the modulation sideband optical beam generated in the interference space 30 (as compared to the optical carrier 125 wavefront)).

Accordingly, each optical carrier 125 forms a corresponding optical carrier beam 185 in the interference space 30. Linear phase shifts of each optical carrier 125 at the channel edge 34 determine the propagation direction of a corresponding plane wave (forming the optical carrier beam 185 of that optical carrier). By providing different degrees (or different slopes) of linear phase shifts to each optical carrier, different propagation directions of the plane wave/optical carrier beam 185 are provided, resulting in the optical carrier beams to be focused at spatially separated locations on the beamspace plane 36 of the interference space 30. Furthermore, when a particular optical carrier is modulated by an RF wave (i.e., the electrical RF signal resulting from the capture of the RF wave by the antenna array 110), the resulting modulation sidebands provides an additional linear phase offset (corresponding to the AoA of the RF wave) to the linear phase offset of the optical carrier. A modulation sideband optical beam 185 is produced in the interference space 30 corresponding to this modulation sideband that is offset (in its plane wave propagation direction/beam direction) from its optical carrier beam 185 of its associated optical carrier as a function of the AoA of that RF wave. Note that the linear phase offset of a modulation sideband may be more or less than that of its optical carrier. At the beamspace edge 36, the modulation sideband beam may be spatially offset from the corresponding optical carrier beam 185 in either direction with respect to a ID array of lenslets 50-2 and in any direction with respect to a 2D array of lenslets 50-2.

As the RF wave modulates each of the optical carriers 125, it thus generates corresponding first and second modulation sidebands on either side of the optical carrier in the frequency domain. Considering a group of similar first modulation sidebands (e.g., on the same side of their optical carriers in the frequency domain), the output of these first modulation sidebands into interference space 30 results in a plurality of corresponding optical beams 185 that may be offset from the optical carrier beam 185 of their associated optical carrier 125 in the same manner at the beamspace edge 36 (e.g., offset the same separation distance and in the same direction) (excepting those that may be subject to "wrapping" effects as described herein). Thus, the optical carriers 125 each produce a corresponding set of first modulation sidebands generated from the optical carrier via modulation that produce interference patterns at the beamspace edge 36, that except for "wrapping", are otherwise identical.

In addition to spatial shifts at the beamspace edge 36 introduced by the modulation sidebands, the imaging receiver of U.S. Pat. No. 9,800,346 allows for steering the optical beam formed by the optical carrier and the optical beam formed from the modulation sidebands (in interference space 30) by imposing a linear phase shift (phase blaze) across the waveguide array that corresponds to waveguides 40 here. Such a phase shift moves both the sideband and the optical carrier across the array of output lenslets 70-2 at the beamspace edge 36 of the interference space 30. The different optical carriers 125 with wavelengths $\lambda_1, \lambda_2, \ldots, \lambda_n$ launched into different input waveguides 126 end up in different waveguides at the output waveguides 60, thus the positions of modulation sidebands are also shifted at the output lenslet array 70-2 accordingly. The spatial shift of the sidebands at the output lenslet array 70-2 is such that when considering a single output lenslet 70-2 as in FIG. 1, sidebands corresponding to different arrival directions of RF waves at the antenna array 110 also correspond to different carrier wavelengths $\lambda_1, \lambda_2, \ldots, \lambda_n$.

Figure 3:
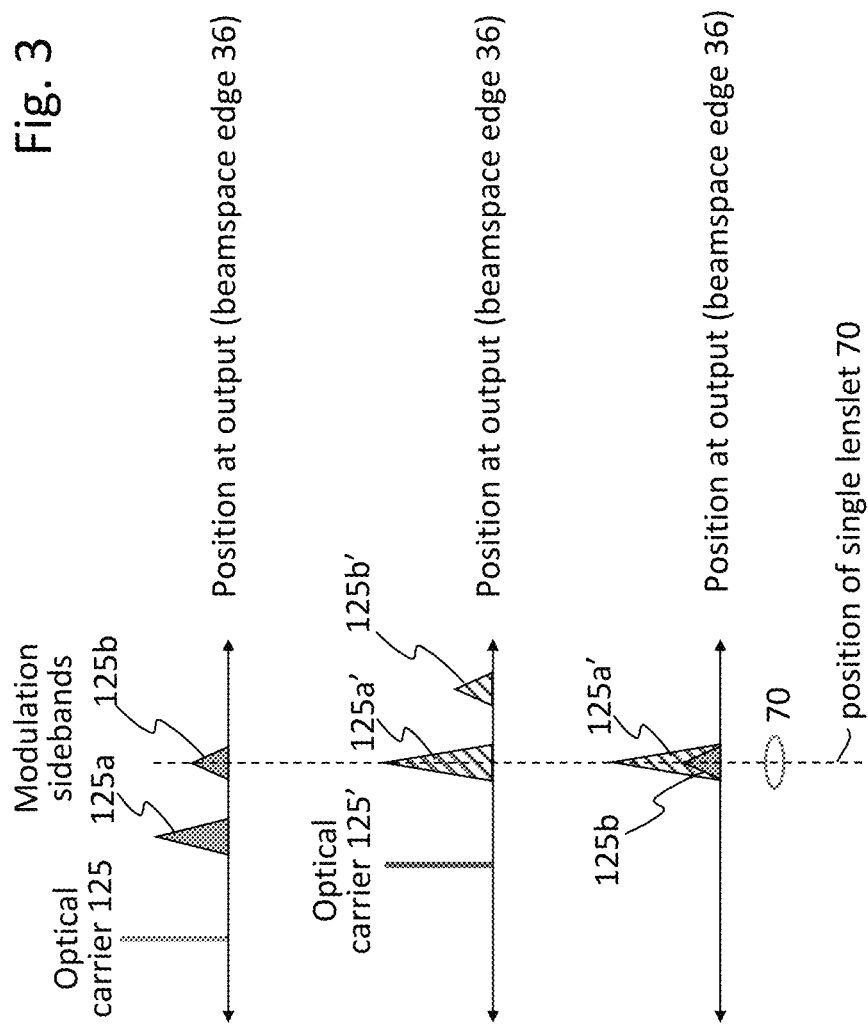
FIG. 3 shows an exemplary spatial distribution of modulation sidebands at the output.

For example, consider the illustration of FIG. 3. Consider two incoming RF waves RFa and RFb arriving at the antenna array 110 from two different directions (two different AoAs). For each optical carrier 125, the two incoming RF waves RFa and RFb generate two optical modulation sidebands that are spatially separated at the output of the interference space 30 (beamspace edge 36). The top panel of FIG. 3 shows an optical carrier 125, having been launched into one of the input optical waveguides 126 and modulated by RF waves RFa and RFb by modulators 130, generate modulation sidebands 125a and 125b to produce corresponding optical beams (optical spots) at the positions shown (offset from the optical beam produced by the optical carrier 125) at the beamspace edge 36 of the interference space 30. The top panel of FIG. 3 is an exemplary interference pattern of optical carrier 125. Referring to the middle panel of FIG. 3, another optical carrier 125' is launched into a different one of input optical waveguides 126. This optical carrier 125' is modulated based on the same RF waves RFa and RFb to generate modulation sidebands 125a' and 125b' that are spatially separated at the output of the interference space 30 in a way similar to sidebands 125a and 125b. The middle panel of FIG. 3 is an exemplary interference pattern of optical carrier 125'. Because the optical-carrier 125' launch position (at lenslets 50-1) is different from the launch position of the optical carrier 125 (at lenslets 50-1), the different slopes of the resulting linear phase offsets of these optical carriers 125, 125' at the channel edge 34 produce differently directed wavefronts of the corresponding optical beams generated by these optical carriers 125, 125' in the interference space 30. The different slopes of the linear phase offsets also cause the modulation sidebands of optical carriers 125 and 125' to be similarly spatially shifted with respect to each other at the beamspace edge 36 (the output of the interference space 30).

In the illustration of FIG. 3, the shift is such that the position of modulation sideband 125b is the same as the position of the sideband 125a'. Therefore, (referring to the bottom panel of FIG. 3) a lenslet (70-2) placed at the position of the dashed line in FIG. 3 would receive both modulation sidebands 125b and 125a' corresponding to both of the RF waves RFb and RFa (arriving at the antenna array 110 at two different AoAs). Furthermore, since the modulation sidebands 125b and 125a' originate from different optical carriers 125 and 125', they have optical wavelengths determined by the corresponding optical carriers (and by the frequency of the captured RF waves). As a result, a single output waveguide 60 (coupled to the lenslet 70-2) may carry modulation sidebands corresponding to different RF-waves having different AoAs at the antenna array 110, with the AoA of the modulation sideband being encoded by the different optical wavelengths of the modulation sideband (corresponding to the respective optical carriers).

Consider a particular RF scene captured by the antenna array 110. The RF scene comprises a plurality of RF waves provided by different RF sources that arrive at the antenna array at different AoAs (e.g., in dependence on the location of the RF source). The antennas 120 capture each of these RF waves and generate corresponding electrical RF signals to modulate each of the optical carriers 125 via electro-optic modulators 130. Each of the optical carriers 125 thus generates a corresponding interference pattern corresponding to the RF scene at the beamspace edge 36 of the interference space 30. The interference pattern produced by an optical carrier 125 at the beamspace edge 36 may be an optical representation of the RF scene (e.g., with modulation sidebands of the optical carrier corresponding in location at the beamspace edge 36 to the AoA of an RF wave (which may correspond to the location of an RF source when the RF wave is received by the antenna array 110 without reflection or other redirection of the RF wave as it propagates to the antenna array 110)). The interference pattern produced by an optical carrier 125 may comprise one or more sub-patterns, each subpattern corresponding to an AoA of an RF wave (such as described in U.S. Patent Pub. No. 2021/0257729, incorporated herein by reference in its entirety), each subpattern preserving the phase and amplitude of the RF wave to preserve the information encoded therein.

Except for the "wrapping" of the interference patterns at the beamspace edge 36, each interference pattern of each optical carrier 125 at the beamspace edge 36 may be identical ("identical" patterns here include patterns that may differ in size, such as size differences that may result from the different wavelengths of the optical carriers) or otherwise correspond to each other. Because of the different linear phase shifts of each optical carrier 125 at the channel edge 34, the interference patterns of the optical carriers 125 at the beamspace edge 36 are spatially offset with respect to one another (corresponding to the spatial offsets of the optical carriers 125 at the beamspace edge 36 as discussed herein).

It should be appreciated that spatially shifting an interference pattern across the beamspace edge 36 may result in "wrapping" of that interference pattern, such that as a portion of the interference pattern moves to cross a boundary of the beamspace edge 36, it enters (is generated at) an opposite boundary of the beamspace edge 36. Thus, if a first interference pattern were to be duplicated side by side in all relevant directions across the beamspace edge (in one dimension for a 1D beamspace and in two dimensions for a 2D beamspace), the interference patterns of the optical carriers 125 may correspond to that captured by a window (e.g., equal in size to the beamspace edge) placed across this duplicated interference pattern, with each optical carrier 125 shifting this window in accordance with the linear phase offset imposed on that optical carrier 125.

The identical interference patterns of each optical carrier 125 are thus superimposed on each other at the beamspace edge 36 of the interference space 30. Considering again the concept of a first interference pattern duplicated side by side in all directions across the beamspace edge 36, each shifted "window" across this duplicated interference pattern (corresponding to each optical carrier 125) are superimposed at the beamspace edge 36. As such, a single lenslet 70-2 may thus capture all parts of the same first interference pattern, albeit parts collected from the different versions of this first interference pattern produced (and shifted) by the different optical carriers.

These "parts" of this first interference pattern may be combined in the same optical waveguide 60 and reassembled after transmission by separating these parts from one another by demultiplexer 180, with the location of these parts within the first interference pattern being determined by the optical carrier associated with the separated part. It will be appreciated that an interference pattern comprises the beams of light 185 formed in interference space resulting from the modulation sidebands of an optical carrier. Thus, the parts of the interference pattern described here correspond to these modulation sideband beams (as focussed on the beamspace edge 36). Note that if the interference patterns of the optical carriers are not identical, determined correspondences between the interference patterns may be used to translate the interference patterns of the optical carriers to a "standard" interference pattern, from which the AoA of the RF waves may be identified.

Figure 9:
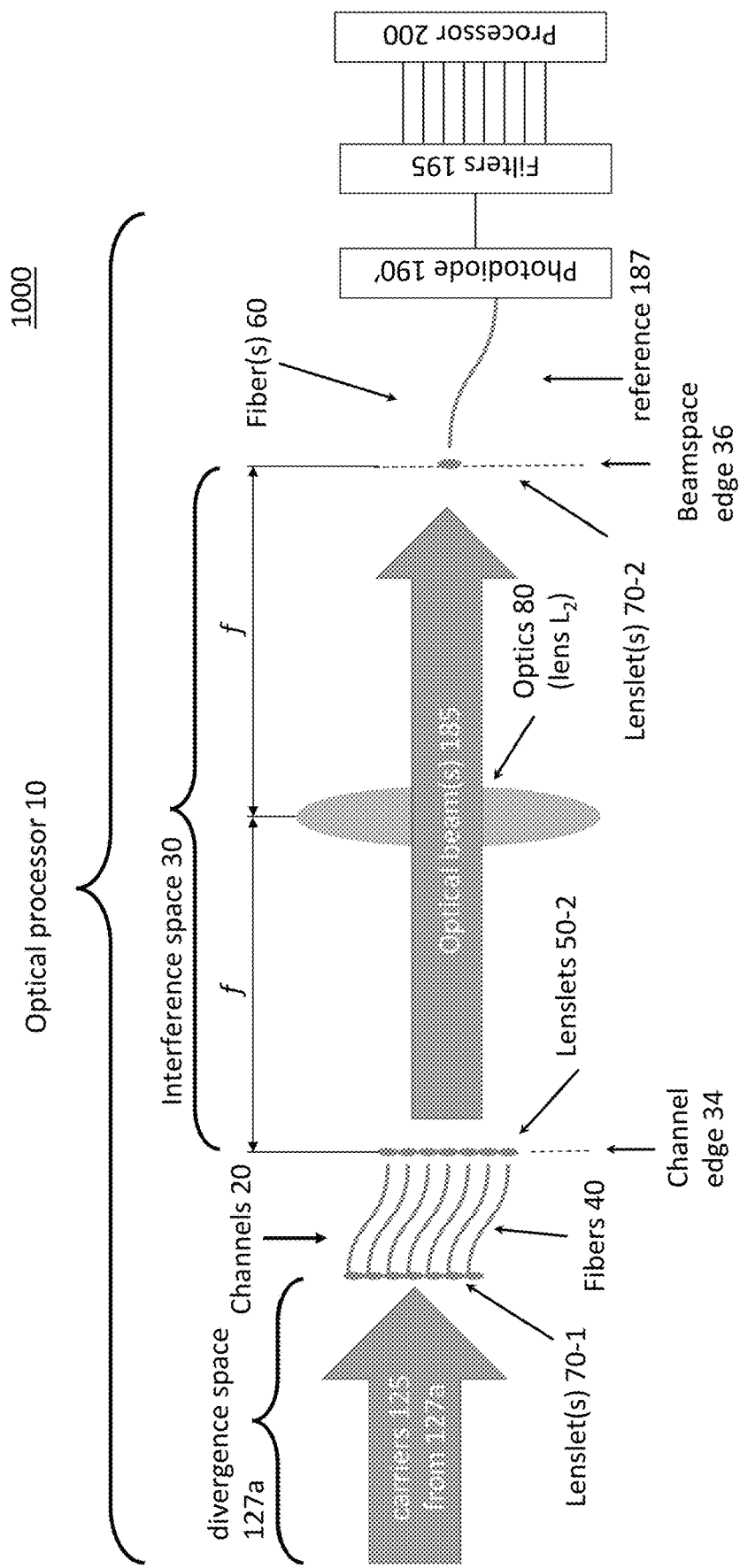
FIG. 9 illustrates details of an alternative embodiment of an imaging receiver that may incorporate the optical processors described herein.

As noted, the optical wavelengths of the modulation sidebands are not exactly the same as those of the optical carriers 125. An RF electrical signal used to modulate an optical carrier 125 will create modulation sidebands that differ in frequency from the optical carrier 125 by the frequency of the RF electrical signal. However, optical carriers 125 may be selected to have frequency differences that are significantly different than that of the RF electrical signal (Note that the RF electrical signal frequency may be the same as the frequency of the captured RF wave when no additional signal processing (e.g., RF mixing) is introduced between the antennas 120 and the electro-optic modulators 130, or may be an RF upmixed or RF downmixed version of the captured RF wave when RF mixers are inserted in the RF signal path between the antennas 120 and the electro-optic modulators—an implementation that is considered within the scope of this invention). For example, the frequency differences between the optical carriers 125 may be chosen to be at least 3 times or at least 10 times or at least 100 times or at least 1000 times greater than the maximum operational frequency of the antennas 120. Thus, modulation sideband frequency can be identified as corresponding to a particular optical carrier frequency (from which the modulation sideband was derived)—even though offset from this optical carrier frequency—since the corresponding optical carrier frequency is closest in frequency to the modulation sideband frequency, and thus the encoded AoA—corresponding to the optical carrier frequency—can be identified. Alternatively, the optical carriers 125 may be selected to have frequency differences significantly less than the RF carrier frequency, but significantly greater than the instantaneous bandwidth of the RF signal. In this case, the information carried by the RF waves may be recovered by mixing the optical output collected by a single lenslet 70-2 and waveguide 60 with a single wavelength of the reference optical signal 187 and separating signals corresponding to different AoAs using electronic means, for example by using bandpass filters, or by using digital filter(s) as indicated using numeral 195 in FIG. 9. In addition, a combination of optical filtering and electronic or digital filtering, as described above, may be used to discriminate the different AoAs of different detected signals.

Note that the identification of the optical carrier frequency can be performed as part of the demultiplexing process discussed herein. For example, wavelength-division demultiplexing may result in substantially treating an optical carrier and its modulation sidebands the same due to their relatively small differences in wavelength (as compared to other optical carriers and their modulation sidebands). As shown in FIG. 8, output fiber 60 may carry all the optical carriers and their modulation sidebands to a demultiplexer 180 (e.g., a wavelength-division demultiplexing). The optical carriers (and their modulation sidebands) carried by the output fiber 60 may be separated from one another according to wavelength by the demultiplexer and processed to extract the RF signal information contained in the modulation sidebands.

For example, each optical carrier 125 may be separated (with its corresponding modulation sidebands) from all other optical carriers 125 and their corresponding sidebands via demultiplexer 180. Thereafter, for each optical carrier 125 and its modulation sidebands, a corresponding optical filter may be applied to extract a single modulation sideband (removing the optical carrier 125 and the other one of the modulation sidebands). The single modulation sideband may be transmitted along a dedicated waveguide to a corresponding photodiode (190).

Prior to reaching the photodiode 190, the modulation sideband is combined with a reference optical signal 187 with a combiner (not shown) creating a "combined signal". The reference optical signal 187 differs by a set frequency from the optical carrier of the modulation sideband and is phase locked with the optical carrier of the modulation sideband such a that this combined signal has a beat frequency corresponding to the frequency of the RF wave corresponding to the modulation sideband (having the AoA encoded by the optical carrier). This combined signal of the modulation sideband and the reference optical signal 187 impinges a corresponding one of the photodiodes 190 which generates an IF electrical signal corresponding to the beat frequency of the combined signal. The IF electrical signal may then be processed in a conventional manner to extract information encoded therein (as provided by the corresponding RF wave captured by the antenna array 110).

Note that although the reference signal 187 may be introduced after the optical carrier and its modulation sidebands are separated by the demultiplexer, it may instead be introduced and combined with a corresponding optical carrier and its modulation sidebands "upstream" (optically), such as with a combiner inserted into the optical path of optical waveguides 40 after electro-optic modulation or by a separate waveguide directly into interference space 30. If the reference signal 187 is close in wavelength to its optical carrier, it may be separated together with its optical carrier 125 by demultiplexer 180. Alternatively, the reference signal 187 may be separated from its optical carrier 125 and sidebands by the demultiplexer 180, and then combined with at least one of these sidebands with a combiner (it may be combined with both sidebands and the optical carrier if optical filtering is performed after the combiner).

Thus, each of the modulation sidebands of an optical carrier may be extracted and converted into a corresponding RF electrical signal by a corresponding one of the photodiodes 190 and processed by processor 200 to extract the information carried by the modulation sideband (and thus the information of the RF wave represented by the modulation sideband). All of the RF waves captured by the antenna array 110 may generate a corresponding modulation sideband, all of which may converge on the same spot of the beamspace edge 36 to be captured by lenslet 70-2 (or other optical pickup) and transmitted by a single waveguide (e.g., single optical fiber 60). The different modulation sidebands transmitted by the waveguide 60 may be identified as corresponding to an RF wave of a particular AoA based upon optical carrier 125 corresponding to the modulation sideband. Accordingly, encoding different AoAs on different optical-carrier wavelengths may be achieved by directing such different optical-carriers to different spatial positions at the output of the interference space, such as with the Fourier lens $L_2$.

Figure 4:
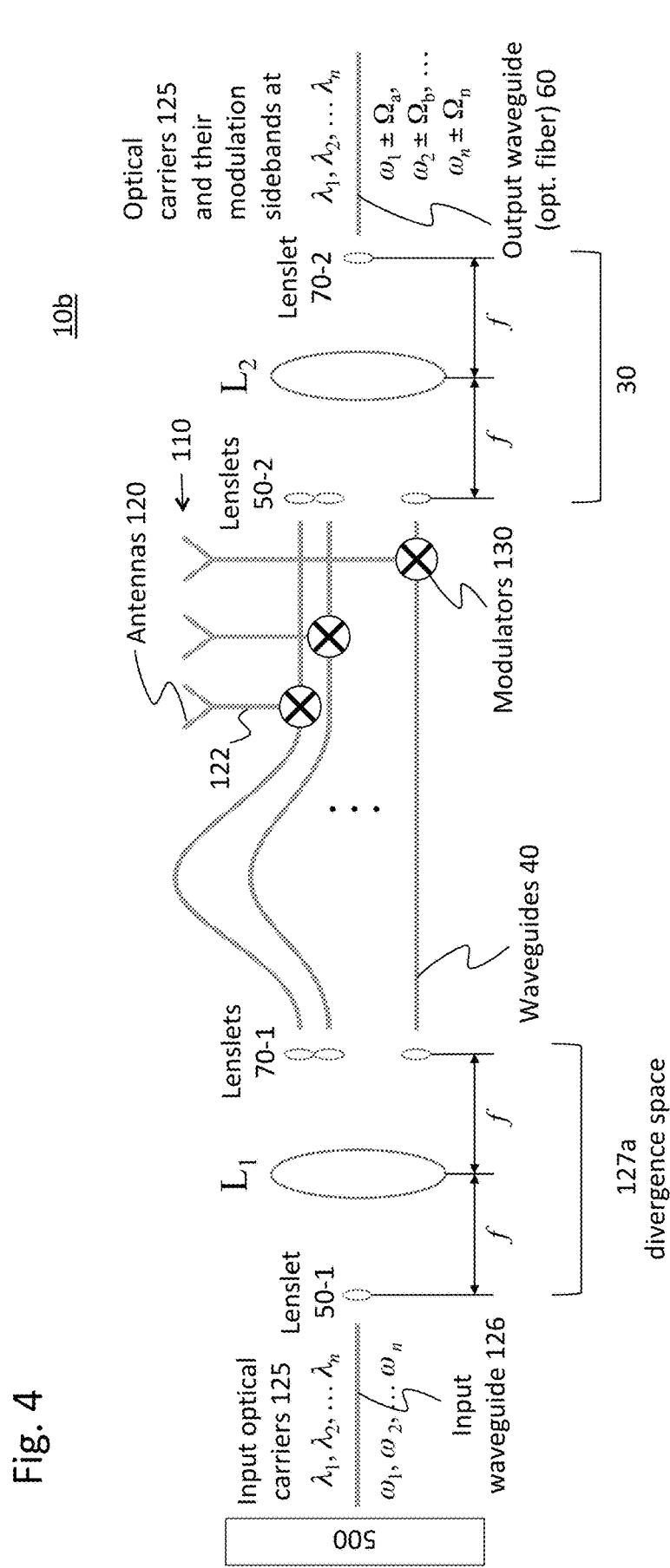
FIG. 4 is a schematic diagram of an alternative RF-photonic system that maps different directions of RF-wave arrival to different optical wavelengths.

The distribution of these different optical-carriers (of different wavelengths of light) to different spatially-separated outputs may be accomplished by employing an arrayed-waveguide grating (AWG) demultiplexer. FIG. 4 illustrates an optical processor 10b (that may be used with the receiver 1000 of FIG. 8) according to an embodiment of the present invention that employs an AWG demultiplexer. In this example, a single input waveguide 126 delivers all the input optical carriers 125 to the system. Lenslet 50-1 collimates the optical input from waveguide 126 and lens $L_1$, in combination with lenslets 70-1, divides the input light among waveguides 40. The waveguides 40 form an AWG by employing progressively increasing waveguide lengths of waveguides 40 with respect to a direction at the termination of the waveguides 40 (at the channel edge 34 of interference space 30). In the example of FIG. 4, the lengths of the waveguides 40 are increased in the vertical direction of the illustration of FIG. 4. The remainder of the system may be the same as that discussed with respect to FIG. 1, and detailed repetitive description may thus be omitted.

Because of the progressively increasing waveguide lengths of the AWG, the light output by the waveguides 40 (via lenslets 50-2) into the interference space 30 is offset in phase. More specifically, with respect to a particular one of the optical carriers 125 (being carried by all of waveguides 40), the AWG may introduce (add) a linear phase offset of that optical carrier at the channel edge 34 of the interference space 30. Such a linear phase offset may cause an output of a particular fiber 40 (for a particular one of the optical carriers) to have a phase offset that is proportional to a distance of the particular fiber 40 in particular direction (e.g., vertical direction) from a reference point. When the outputs of fibers 40 are evenly spaced apart in a particular direction (e.g., vertical direction in FIG. 4), the linear phase offset of a particular carrier 125 causes each waveguide 40 to provide the same incremental phase offset of that carrier 125 with respect to its immediate neighboring fiber 40 (with respect to that particular direction across the lenslets 50-2). For example, in the example of FIG. 4, if the outputs of waveguides 40 at the channel edge 34 of interference space 30 are regularly spaced apart in the vertical direction (with respect to the illustration of FIG. 4), the same incremental phase offset may be introduced to a particular carrier 125 by each output of waveguide 40 with respect to the output of the neighboring waveguide 40 immediately below such output.

It should be appreciated that the linear phase offsets are introduced by the AWG by changing the optical path lengths formed by the waveguides 40 (i.e., the optical path lengths from the inputs to outputs of the optical waveguides 40. Providing different optical path lengths may be accomplished in several ways, such as by providing different physical lengths of the optical waveguides 40 (which can be before and/or after the electro-optic modulators 130), and/or by providing other optical delays (e.g., an optical delay device) in the optical path. When using optical delay devices and optical fibers, the physical path lengths of the optical fibers (from their input at divergence space at lenslets 70-1 to their output at channel edge 34 of interference space at lenslets 50-2) may be the same or different.

Note that the outputs of waveguides 40 at channel edge 34 may be arranged in a straight line (when formed as a linear array) or arranged in a plane (when formed as a two dimensional array) and the above discussion is in such context. However, the outputs of waveguides 40 at channel edge 34 may also be arranged in a curved line (e.g., when formed as linear array, as e.g., in a star coupler) or arranged as if on a curved surface (e.g., in two dimensions when formed as a two dimensional array). In such latter cases, a linear phase offset of a carrier 125 in the interference space 30 may be introduced by the AWG to provide the equivalent result (e.g., the particular wavefronts described herein), although the phase offsets of a carrier 125 with respect to their specific outputs at the ends of the waveguide 40 (that are physically offset or staggered with respect to a line or plane) may differ from that described above.

The linear phase offset of an optical carrier 125 at the channel edge 34 of interference space 30 determines the direction of the resulting wavefront of that optical carrier (e.g., a planar wavefront formed by the combination of individual spherical wavefronts formed from each output of a lenslet 50-2) in the interference space 30. Due to the different frequencies of the optical carriers 125, the degree of this linear phase offset at the channel edge 34 (which also may be referred to as the slope of the linear phase offset) differs for each optical carrier 125, resulting in different propagation directions of the wavefront for each of the optical carriers 125 and thus the different locations at beamspace edge 36 at which the optical carriers 125 are focused.

As noted, the remainder of the system may be the same as that described with respect to FIG. 1. For example, in addition to the spatial offsets of the optical carriers 125 at the beamspace edge 36 (introduced by the AWG), modulators 130 introduce further spatial offsets at beamspace edge 36 of the modulation sidebands as a result of their modulation of the optical carriers 125 based upon the RF waves captured by the antennas 120 (with lens $L_2$ performing Fourier transformation), and lenslet 70-2 collecting the modulation sidebands and providing the same to be transmitted by output waveguide 60.

The system may be implemented using lenses and lenslets, as illustrated in the figures above. In an integrated form, the divergence space 127a and interference space 30 may be implemented using star couplers in place of the lens configurations. The latter approach may be particularly useful as it may allow low-cost, manufacturing in a photonic integrated circuit (PIC) format to allow the optical processor (or portions thereof) to be formed in a single chip (e.g., single PIC). Furthermore, the present invention may take advantage of AB-mapping technique disclosed in U.S. Patent Pub. No. 2021/0257729 (U.S. patent application Ser. No. 17/160, 676 (herein incorporated by reference in its entirety). Thus, the 'correspondence' between patterns (the second pattern of lenslets 70-1, the third pattern of antennas 120 and the fourth pattern of lenslets 50-2) may mean the mapping amongst the respective arrays, as prescribed in application U.S. Patent Pub. No. 2021/0257729 (e.g., the second pattern of lenslets 70-1 and the fourth pattern of lenslets 50-2 may be the same, and these second and fourth patterns may correspond to the third pattern of the antennas by virtue of AB-mapping). 'Correspondence' between these patterns also indicates the patterns may be the same (including both equal and different sized patterns) or subject to a linear transformation (e.g., positions of the elements are mapped via a linear transformation matrix) such that one pattern may be stretched or squeezed (i.e., asymmetrically scaled), rotated, sheared and/ or reflected with respect to the other.

Embodiments of the present invention may encode different directions of RF-waves arriving at the antenna onto different wavelengths of light. All the wavelengths may be carried by a single waveguide, which may be an optical fiber.

As a result, a single optical fiber may carry all information captured by the antenna array, including the information about the angle of arrival (or direction of arrival), which may be extracted at the far end of the fiber, such as separating the light of different wavelengths with an AWG demultiplexer to separate the modulation sidebands. Each separated modulation sideband may then be converted to an intermediate frequency (IF) electrical signal with a photodiode, the IF electrical signal corresponding to one of the RF waves captured by the antenna array 110 which may then be downconverted to baseband and have information encoded therein extracted. Having a single fiber carry all the RF spatial channels may be preferable over using multiple fibers as it lowers the cost of connecting the radio head with the base station in communication networks. Furthermore, existing network infrastructure, where the optical fibers are already laid out, may be used with new radio heads that are sensitive to the direction of RF-wave propagation. Such re-use of infrastructure lowers the cost of new-technology deployment to dramatically increase wireless-network capacity.

Figure 5:
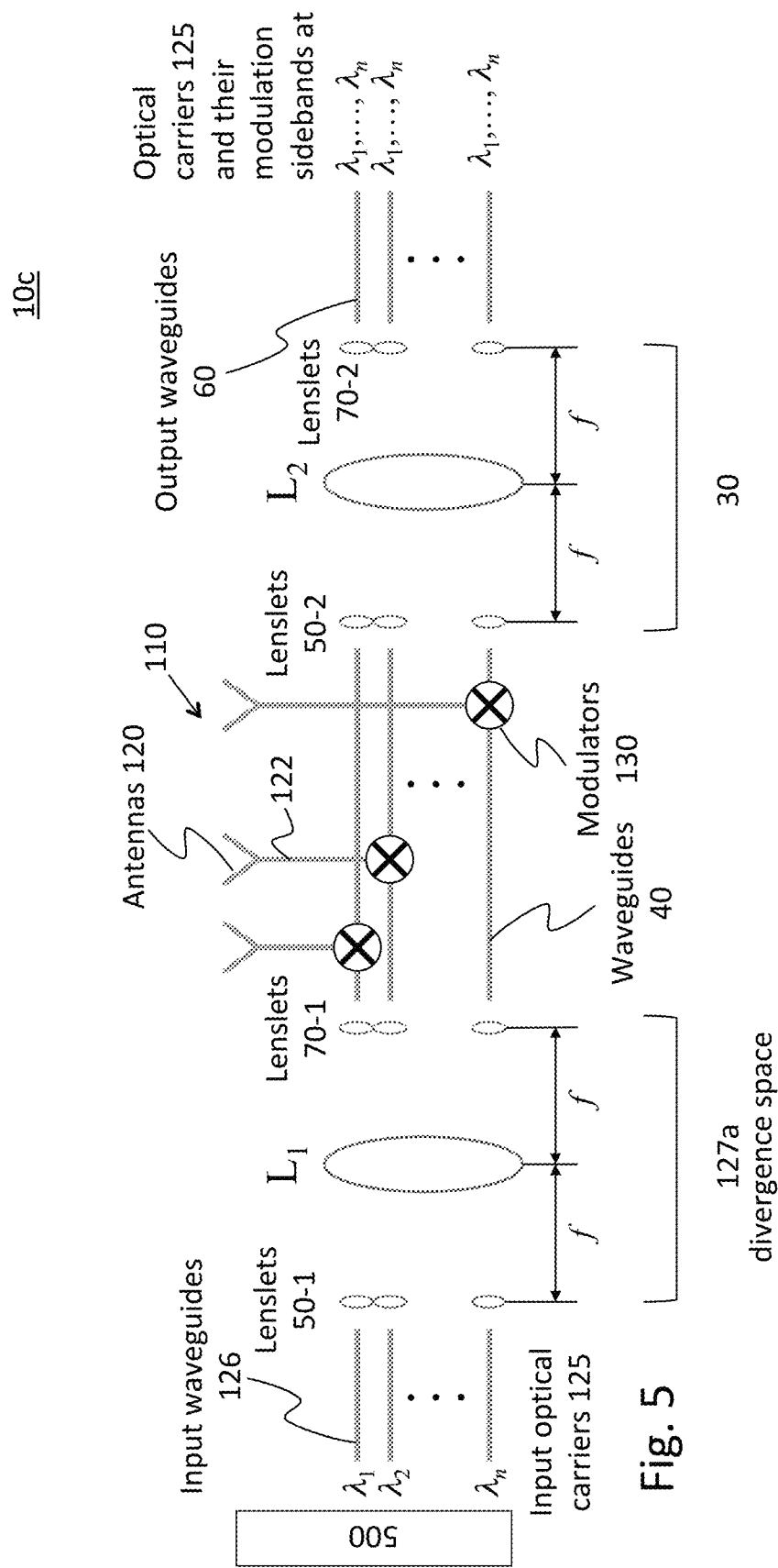
FIG. 5 is a schematic diagram of a variation of the system with multiple outputs.

The present invention may be modified to include multiple outputs as shown with respect to optical processor 10c in the embodiment represented by FIG. 5. The structure and operation of this embodiment is the same as that of FIG. 1 up to the beamspace edge 36 of the interference space 30 after the optical carriers and their modulation sidebands are transmitted through lens $L_2$. In FIG. 5, following lens $L_2$ is an array of lenslets 70-2, each lenslet 70-2 being coupled to a corresponding output waveguide 60, similar to the arrangement of the output in FIG. 2. As a result of this arrangement, each of the output waveguides 60 may carry each of the respective carriers 125 at wavelength $\lambda_1$, $\lambda_2, \ldots, \lambda_n$, (just as was the case when discussing FIG. 2). In addition, each of the output waveguides 60 may carry all modulation sidebands corresponding all AoA-s of the incoming electromagnetic waves (just as was the case when discussing FIG. 1 with respect to the single waveguide 60). However, each waveguide 60 may encode the AoAs onto wavelengths differently. For example, the sideband corresponding to the broadside AoA may appear in the top waveguide 60 encoded on carrier with wavelength $\lambda_n$, whereas in the bottom waveguide 60, it may be encoded on carrier with wavelength $\lambda_1$. Other AoA directions may encode on other wavelengths accordingly.

Figure 6:
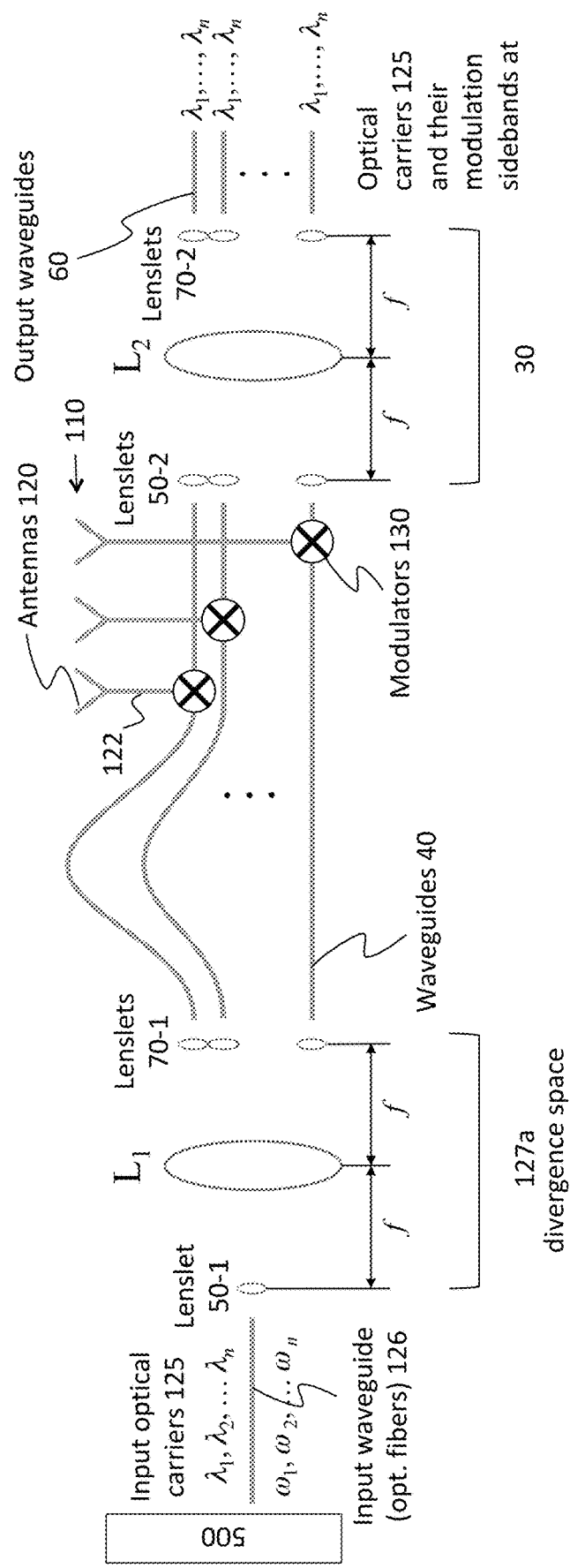
FIG. 6 is a schematic diagram of a system variation with a single input and multiple outputs.

The configuration of FIG. 5 having multiple outputs may also be implemented with a system having of the optical carriers 125 provided with a single input as shown in FIG. 6. FIG. 6 illustrates an optical processor 10d that may be used with receiver 1000 of FIG. 8. The structure and operation of the system of FIG. 6 is the same as that of FIG. 4 up to the beamspace edge 36 of the interference space 30 after the optical carriers 125 and their modulation sidebands are transmitted through lens $L_2$ while the output at beamspace edge 36 is the same as that of FIG. 5. This way a system with a single optical input (waveguide 126) and multiple outputs (waveguides 60) ensues, where each output waveguide 60 may carry all the modulation sidebands corresponding to different AoA-s (of the corresponding RF waves received at the antenna array 110) encoded on different optical carriers 125 (of different wavelengths), where this AoA-to-wavelength encoding differs among the outputs (waveguides 60).

The embodiments described herein may have the AoA-to-wavelength encoding changed (as provided by the output waveguides 60) by applying a phase blaze (to change in the slope of the linear phase offset at the channel edge 34) across the array of waveguides 40 array. Such linear phase offset may be in addition to the wavelength-dependent linear phase offset provided by the AWG of FIGS. 4 and 6 (which may increase or decrease the linear phase offset (i.e., change the slope) of the optical carriers 125 at the channel edge 34). The phase blaze shifts all the images produced by the sidebands on the beamspace edge 36 just as it does for a single optical carrier thereby changing the AoA-to-wavelength encoding in the waveguide(s) 40.

The availability of multiple outputs at the beamspace edge 36 may be used in the context of wireless communication. In this case the different outputs, each carrying all AoA-s encoded with optical carriers at different wavelengths, may be used to communicate with different nodes of the network so as to make the network more efficient. For example, one fiber may be directed to the central office whereas several others may be directed to peer nodes that may perform spatial-spectral processing on the signals and use the results to optimize the allocation of spatial-spectral bandwidth at the local level without engaging the central office. Such processing and resource allocation at the node level may reduce the latency of the network and thereby improve user experience in addition to improving network efficiency.

Figure 7:
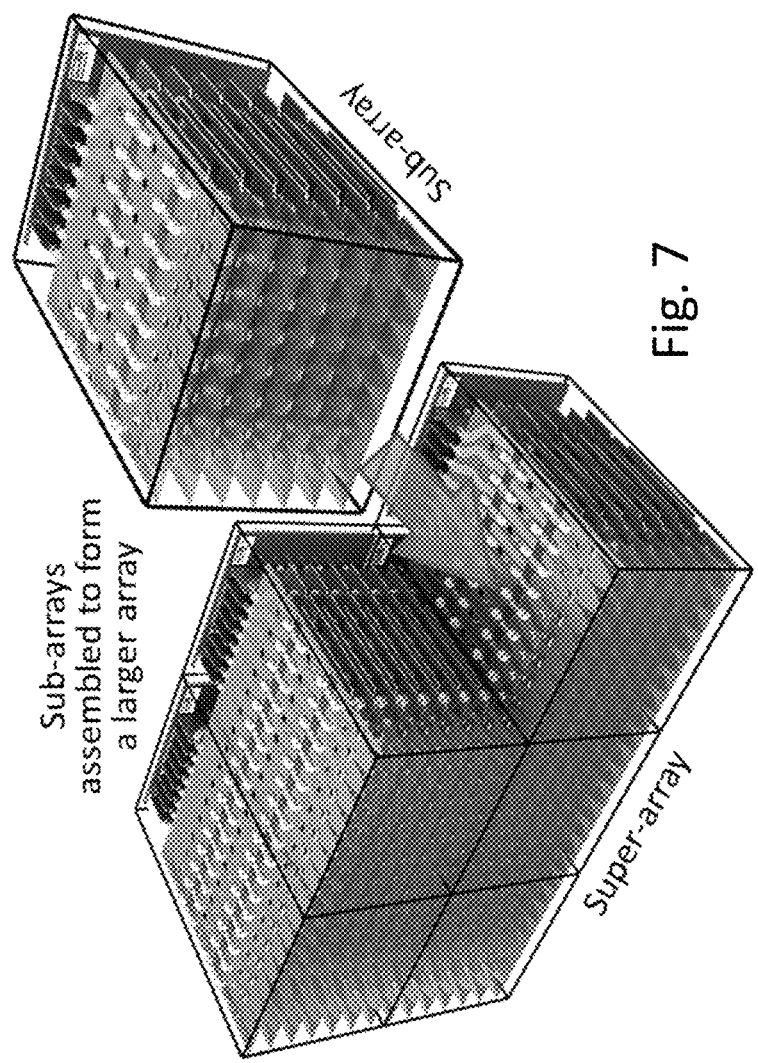
FIG. 7 illustrates an example application of the system in segmented phased arrays.

Another application includes a modular system illustrated in FIG. 7, which combines several self-contained subsystems, into a larger system. The resulting super-array offers improved resolution thanks to the increased aperture size. Beam forming in the super-array may be realized hierarchically where the beams are first formed at the sub-array stage. Then, single-fiber outputs of the sub-arrays that carry wavelength-encoded AoAs are combined in a second-stage optical processor, which may take advantage of AB mapping described in U.S. Patent Pub. No. 2021/0257729 (U.S. patent application Ser. No. 17/160,676) (incorporated by reference herein in its entirety) and be fabricated using planar technology. The beamspace-to-wavelength (or beamspace-to-color=BC) mapping in the first stage is such that the same wavelength encodes a particular AoA for all sub-arrays. The second-stage optical processor forms all sub-beams resolved by the super-array simultaneously: it splits each beam resolved by a single sub-array into sub-beams that are resolved by the super-array. As a result, the wavelength of the output optical beam corresponds to the beam resolved by the sub-array whereas the position of the optical output in the second-stage optical processor corresponds to the sub-beam resolved by the super-array. Here, the number of optical-carrier wavelengths equals the number of beams resolved by the sub-array whereas the number of outputs in the second-stage optical processor equals the number of sub-arrays.

This way multiple sub-arrays may be combined into a single super-array to yield improved resolution. In such hierarchical optical processing, the system needs only a single second-stage optical processor, with the number of optical I/O-s equal to the number of sub-arrays, to discern all beams resolvable by the super-array.

In the specific example illustrated in FIG. 7, each sub-array is densely populated with 7×8=56 antenna elements and, therefore, may resolve, in principle, 56 individual beams. Hence, the sub-array optical processor uses 56 optical-carrier wavelengths to encode signals corresponding to 56 RF AoAs resolvable by the sub-array. The super-array consists of 2×3=6 sub-arrays. Therefore, the second-stage optical processor accepts 6 inputs and produces 6 outputs, each with 56 wavelengths, for the total of 56*6=336 optical signals that correspond to 336 beams that the super-array may resolve.

The embodiments described above use different optical wavelengths to discriminate between different AoA-s in the conveyed optical signals (i.e., wavelength-division multiplexing). However, these embodiments may be modified to implement alternative methods of encoding several independent data streams for transmission in a single channel such as an optical fiber (e.g., a single waveguide 60). For example, code-division multiplexing may be employed in these alternative embodiments. To this end, with respect to the embodiments of FIGS. 1 and 5, rather than launching $\lambda_1$, $\lambda_2, \ldots, \lambda_n$ (of different wavelengths) as the optical carriers 125 from the input waveguides 126 into the divergence space 127a, one may use optical carriers 125 having the same wavelength, with each optical carrier 125 modulated using different, for example orthogonal, codes. Thus, AoA-to-orthogonal-code encoding may be achieved in a single output waveguide 60. In this case, the different data streams, corresponding to those provided by the captured RF waves at the antenna array 110 having the different AoA-s, may be transmitted together in the same output waveguide 60 (each encoded with a different optical carrier having a different orthogonal code) and separated at the far end of the transmission channel (at the output of a output waveguide 60) using code-division-multiplexing/de-multiplexing encoders/decoders (codecs) consistent with conventional techniques of the art.

Although the description references use of a single optical fiber single optical channel, single optical processor, single lens, single beam, etc., it will be appreciated that the invention may be implemented with a plurality of such elements if desired, including, but not limited to the alternative embodiments described herein. For example, some embodiments of the invention may be implemented with several of the disclosed systems or parts of the disclosed systems formed to operate in parallel, such as after splitting received RF signals or coupled to different antennas and/or different antenna arrays.

The invention claimed is:

1. A method of operating an imaging receiver, comprising:
generating a plurality of optical carriers, each optical carrier having a wavelength that differs from the wavelengths of the other optical carriers;
capturing m RF waves (where m is an integer equal or greater than one) by n antennas (where n is an integer greater than one) of an antenna array, each of the m RF waves arriving at the antenna array at a corresponding angle of arrival (AoA);
for each optical carrier, generating a corresponding optical interference pattern at an output edge of an interference space, each interference pattern formed by one or more modulation sidebands, each modulation sideband corresponding to an RF wave and generated by modulating the optical carrier n times by respective ones of n RF electrical signals derived from the antennas of the antenna array;
at an output optical waveguide at an output of the interference space, inputting modulation sidebands of plural ones of the optical carriers, wherein the optical wavelength of each modulation sideband corresponds to the AoA of the RF wave from which it is derived.

2. The method of claim 1, wherein the patterns of each interference pattern of the optical carriers correspond to one another.

3. The method of claim 1, wherein the patterns of each interference pattern correspond to first pattern that is spatially shifted across the output of the interference space by a different amount for each interference pattern.

4. The method of claim 1, further comprising providing a linear phase shift to each optical carrier with respect to inputs of the optical carrier at an input edge of the interference space, the linear phase shift for each optical carrier being different.

5. The method of claim 4, further comprising:
forming a corresponding optical carrier beam for each optical carrier in the interference space, the optical carrier beams propagate in different directions due to the different linear phase shifts of the optical carriers.

6. The method of claim 5, wherein the linear phase shifts of each optical carrier are provided in optical paths, each optical path carrying each of the optical carriers, the linear phase shifts being generated by providing different optical path lengths from a source of the optical carriers to the output of each of the optical paths.

7. The method of claim 6, wherein the optical paths and the interference space comprise an arrayed-waveguide grating (AWG) demultiplexer.

8. The method of claim 5, wherein the linear phase shifts of each optical carrier are provided in optical paths at an input edge of the interference space, each optical path carrying each of the optical carriers, the linear phase shifts being generated by:
inputting the optical carriers at different corresponding locations of an input of a divergence space; and
each optical carrier diverging across the divergence space to impinge upon plural outputs of the divergence space, wherein for at least some of the optical carriers, the distances between its input to the divergence space and each of the plural outputs of the divergence space differ to generate the corresponding linear phase shift of the optical carrier.

9. The method of claim 8, wherein the divergence space is formed by a first star coupler.

10. The method of claim 9, wherein the first star coupler is formed in a photonic integrated circuit.

11. The method of claim 10, wherein the photonic integrated circuit comprises an optical processor including the first star coupler, waveguides extending between the divergence space and the interference space, each waveguide transmitting each of the plurality of optical carriers, modulators optically coupled to each waveguide to modulate the plurality of optical carriers of the waveguide, and the interference space formed as a second star coupler.

12. The method of claim 1, wherein each interference pattern is formed by focusing optical beams formed in the interference space at the output of the interference space, including an optical carrier beam corresponding to the optical carrier of the interference pattern and a first optical beam corresponding to a modulation sideband of the optical carrier corresponding to a first RF wave of the m RF waves.

13. The method of claim 12,
wherein for each interference pattern, the optical carrier beam corresponding to the optical carrier and the first optical beam are focused at spatially separated locations at the output of the interference space, and
wherein, for at least some of the interference patterns, the spatial separation of the focal locations of the optical carrier beam corresponding to the optical carrier and the first optical beam at the output of the interference space are the same.

14. The method of claim 1, wherein each interference pattern optically represents information encoded in each of the m RF waves and the AoA of each of the m RF waves.

15. The method of claim 1, wherein each modulation sideband input to the output optical waveguide corresponds to an optical carrier that identifies the AoA of the RF wave corresponding to the modulation sideband.

16. The method of claim 15, further comprising:
transmitting by the output optical waveguide, the modulation sidebands of plural ones of the plurality of optical carriers to a demultiplexer;
by the demultiplexer, separating the modulation sidebands of the plural ones of the optical carriers from one another; and
for each separated modulation sidebands:
combining the modulation sideband with a corresponding optical reference signal that is phase locked with the modulation sideband to create a resulting combined beam having an RF beat signal corresponding to the RF wave associated with the modulation sideband, and
generating by a photodiode an RF electrical signal corresponding to the RF beat signal.

17. The method of claim 16, wherein for each optical carrier, generating the interference pattern corresponding to the optical carrier at the output edge of the interference space comprises:
transmitting the optical carrier through n optical paths, each optical path having an electro-optic modulator provided in the optical path,
generating the n RF electrical signals in response to the n antennas of an antenna array capturing the m RF waves,
in each of the n optical paths, modulating the optical carrier with a corresponding one of the n RF electrical signals to generate at least a first modulation sideband of the optical carrier for each of the m RF waves, and
outputting from each of the n optical paths into the input edge of the interference space the optical carrier and the m first modulation sideband(s) of the optical carrier and focusing the same at the output edge of the interference space to generate the interference pattern corresponding to the optical carrier.

18. The method of claim 1, wherein the output optical waveguide is the only optical output of the interference space.

19. The method of claim 1,
wherein the output optical waveguide is one of a plurality of optical output waveguides at the output of the interference space, and
wherein each output optical waveguide provides a different AoA-to-optical carrier wavelength encoding such that in the output optical waveguides, different optical wavelengths of modulation sidebands derived from a first RF wave identify the same AoA of the first RF wave.

20. A method of operating a receiver, comprising:
generating a plurality of optical carriers, each optical carrier having a wavelength that differs from the wavelengths of the other optical carriers;
inputting each optical carrier into a plurality of optical paths such that each optical path transmits a portion of each of the plurality of optical carriers;
at an input edge of an interference space, outputting from each optical path the portions of each of the plurality of optical carriers into the interference space;
for each optical carrier, in the interference space, combining the portions of the optical carrier output by from each optical path into the interference space into a corresponding optical carrier beam in the interference space;
in the interference space, focusing each optical carrier beam to spatially separated positions at an output edge of the interference space;
by an antenna array, capturing a plurality of RF waves arriving at the antenna array at different angles of arrival (AoAs), each antenna of the antenna array generating an RF electrical signal corresponding to the captured RF waves;
for each optical path, by a corresponding electro-optic modulator inserted in the optical path, modulating each of the plurality of optical carriers transmitted by the optical path by a corresponding one of the RF electrical signals to generate at least a first modulation sideband of each optical carrier for each captured RF wave;
at the input edge of the interference space, outputting from each optical path, the first modulation sideband of each optical carrier for each captured RF wave, and combining the same in the interference space to create a corresponding first modulation sideband beam of each optical carrier for each captured RF wave that is focused at the output edge of the interference space at a location that is spatially offset from the optical carrier of the first modulation sideband beam;
inputting into an output optical waveguide, a first modulation sideband beam corresponding to each of the captured RF waves,
wherein the first modulation sideband beams input into the output optical waveguide are first sideband beams of different optical carriers.

21. The method of claim 20, wherein, for each of the first modulation sideband beams input into the output optical waveguide, the optical carrier associated with the first modulation sideband beam corresponds to the AoA of the captured RF wave associated with the first modulation sideband beam.

22. The method of claim 20, wherein each optical carrier beam propagates in a different direction in the interference space due to a corresponding linear phase offset provided to the portions of the optical carrier at the input to the interference space.

23. The method of claim 20, wherein each first modulation sideband beam is offset from the optical carrier beam of its corresponding optical carrier as a function of the AoA of the captured RF wave associated with the first modulation sideband beam.

24. An imaging receiver, comprising:
an optical source configured to generate a plurality of optical carriers, each optical carrier having a wavelength that differs from the wavelengths of the other optical carriers;
n optical waveguides, each optically coupled to the optical source to receive each of the plurality of optical carriers, the n optical waveguides terminating at an input edge of an interference space;
an antenna array comprising n antennas (where n is an integer greater than one), the antenna array configured to simultaneously capture one or more RF waves arriving at the antenna array at a corresponding angle of arrival (AoA);
n electro-optic modulators, each in electrical communication with a corresponding one of the n antennas of the antenna array and each configured to modulate all of the optical carriers provide by a corresponding one of the n optical waveguides with an RF signal resulting from the corresponding one of the n antennas capturing the one or more RF waves, the output of each of the n electro-optic modulators including the optical carriers and one or more first modulation sidebands respectively corresponding to the one or more RF waves captured by the antenna array;

the interference space, the interference space having the input edge that provides an input to the interference space and an output edge that provides an output from the interference space; and an optical pickup at the output edge of the interference space.

25. The imaging receiver of claim 24, further comprising a splitter-combiner having separate inputs of each of the optical carriers generated by the optical source and on outputs respectively coupled to the n optical waveguides, each of the n outputs receive all of the optical carriers as split from its corresponding input of the splitter-combiner, wherein, for each optical carrier provided to the splitter-combiner at a corresponding input, different optical path lengths between the input and the plurality of outputs of the splitter-combiner introduce a corresponding linear phase offset to the optical carrier, and wherein the linear phase offset of the optical carriers are different from one another.

26. The imaging receiver of claim 24, wherein the n optical waveguides and the interference space form an arrayed-waveguide grating (AWG) demultiplexer, wherein the n optical waveguides of the AWG demultiplexer have different optical path lengths and introduce a corresponding linear phase offset to each optical carrier at the input edge of the interference space, and wherein the linear phase offset of the optical carriers are different from one another.

* * * * *